US012625389B2

(12) United States Patent
Le Cain et al.

(10) Patent No.: US 12,625,389 B2
(45) Date of Patent: May 12, 2026

(54) METHOD AND SYSTEM FOR DETERMINING AN OPHTHALMIC ELEMENT ADAPTED TO A WEARER

(71) Applicant: Essilor International, Charenton-le-Pont (FR)

(72) Inventors: Aurélie Le Cain, Charenton-le-Pont (FR); Fabien Muradore, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 551 days.

(21) Appl. No.: 17/619,450

(22) PCT Filed: Jun. 18, 2020

(86) PCT No.: PCT/EP2020/067001
§ 371 (c)(1),
(2) Date: Dec. 15, 2021

(87) PCT Pub. No.: WO2020/254513
PCT Pub. Date: Dec. 24, 2020

(65) Prior Publication Data
US 2022/0308361 A1      Sep. 29, 2022

(30) Foreign Application Priority Data
Jun. 18, 2019    (EP) ..................................... 19305780

(51) Int. Cl.
*G02C 7/02*              (2006.01)
(52) U.S. Cl.
CPC ............. *G02C 7/027* (2013.01); *G02C 7/028* (2013.01)
(58) Field of Classification Search
CPC ........ G02C 7/027; G02C 7/028; G02C 7/066; G02C 7/061; G02C 7/024; G02C 7/08;
(Continued)

(56) References Cited

U.S. PATENT DOCUMENTS 5,461,570 A      10/1995  Wang et al.
7,980,692 B2 *    7/2011  Fisher .................... G02C 7/061
                                                    351/159.74
(Continued)

FOREIGN PATENT DOCUMENTS

CN          106199953 A      12/2016
CN          107430288 A      12/2017
(Continued)

OTHER PUBLICATIONS

International Search Report issued on Sep. 22, 2020 in PCT/EP2020/067001 filed on Jun. 18, 2020.
(Continued)

*Primary Examiner* — Travis S Fissel
(74) *Attorney, Agent, or Firm* — Oblon, McClelland, Maier & Neustadt, L.L.P.

(57)              ABSTRACT

A method for determining an ophthalmic element adapted to a wearer, the wearer having a prescription. The method including at least providing an initial set of ophthalmic elements, each ophthalmic element of the initial set being adapted to the prescription of the wearer, for each ophthalmic element of the initial set, calculating a value of each criterion of a plurality of criteria, the plurality of criteria comprises a plurality of lens criteria and/or a plurality of wearer criteria, generating an optimal set of ophthalmic elements by computing pareto-optimal ophthalmic elements among the ophthalmic elements of the initial set based on the value of each criterion, and determining one final ophthalmic element for the wearer in the optimal set of ophthalmic elements based on selected criteria based on wearer's preferences.

17 Claims, 3 Drawing Sheets

(58) Field of Classification Search
CPC .......... G02C 7/081; G02C 7/06; G02C 7/063;
G02C 7/065; G02C 7/073
USPC ............. 351/159.73, 159.06, 159.42, 159.74
See application file for complete search history.

(56) References Cited

U.S. PATENT DOCUMENTS

| | | | | |
|---|---|---|---|---|
| 8,303,113 | B2 | 11/2012 | Esser et al. | |
| 8,356,896 | B2 | 1/2013 | Esser et al. | |
| 8,434,025 | B2 | 4/2013 | Fisher et al. | |
| 2005/0122472 | A1 | 6/2005 | Fisher et al. | |
| 2005/0270482 | A1* | 12/2005 | Fisher | G02C 7/028 |
| | | | | 351/159.42 |
| 2005/0278229 | A1 | 12/2005 | Igo | |
| 2008/0282183 | A1* | 11/2008 | Fisher | G02C 7/028 |
| | | | | 715/772 |
| 2009/0290125 | A1* | 11/2009 | Varnas | G02C 7/061 |
| | | | | 351/200 |
| 2012/0008090 | A1* | 1/2012 | Atheimer | G02C 7/066 |
| | | | | 703/2 |
| 2014/0368790 | A1 | 12/2014 | Drobe et al. | |
| 2017/0023799 | A1 | 1/2017 | Granger et al. | |
| 2017/0299888 | A1 | 10/2017 | Tranvouez et al. | |

FOREIGN PATENT DOCUMENTS

| | | | |
|---|---|---|---|
| CN | 108139603 | A | 6/2018 |
| EP | 3 006 991 | A1 | 4/2016 |
| EP | 2 684 094 | B1 | 8/2018 |
| WO | WO 03/052491 | A1 | 6/2003 |
| WO | WO 2004/046792 | A1 | 6/2004 |
| WO | WO 2006/116820 | A1 | 11/2006 |
| WO | WO 2007/056797 | A1 | 5/2007 |
| WO | WO 2008/089995 | A1 | 7/2008 |
| WO | WO 2008/089998 | A1 | 7/2008 |
| WO | 2 028 527 | A1 | 2/2009 |
| WO | WO 2009/065961 | A1 | 5/2009 |
| WO | WO 2010/084019 | A1 | 7/2010 |
| WO | WO 2012/119668 | A1 | 9/2012 |
| WO | WO 2013/117766 | A2 | 8/2013 |
| WO | WO 2015/169813 | A1 | 11/2015 |

OTHER PUBLICATIONS

Office Action issued Dec. 12, 2024 in Chinese Patent Application
No. 202080040210.7, with concise English translation.

* cited by examiner

METHOD AND SYSTEM FOR DETERMINING AN OPHTHALMIC ELEMENT ADAPTED TO A WEARER

FIELD OF THE INVENTION

The invention relates to a method and a system for determining an ophthalmic element adapted to a wearer. The invention further relates to a method for providing an ophthalmic lens to a wearer from such an ophthalmic element.

BACKGROUND OF THE INVENTION

An optical lens is generally determined to be then manufactured in accordance with the wearer specifications. In the case, for example, of an ophthalmic lens for the correction or improvement of eyesight, the ophthalmic lens is determined according to a wearer prescription corresponding to the visual requirements of that wearer. In addition, other requirements, for example relative to aestheticism, comfort, can be taken into account to determine the ophthalmic lens, for example the shape and size of the spectacle frame supporting the ophthalmic lens.

As these requirements are generally antagonists, they cannot be all satisfied simultaneously. Thus, a compromise is necessary.

Nevertheless, huge number of compromises are possible according to these requirements in order to fully customize the ophthalmic lens to the wearer, by varying for example at least the optical design or the geometry of the lens.

Consequently, there is a need for determining the best compromise for the wearer among the huge number of compromises.

SUMMARY OF THE INVENTION

To this end, the invention proposes a method implemented by computer means for determining an ophthalmic element adapted to a wearer, the wearer having a prescription, the method comprising at least:

a) providing an initial set of ophthalmic elements, each ophthalmic element of the initial set being adapted to the prescription of the wearer;

b) for each ophthalmic element of the initial set, calculating a value of each criterion of a plurality of criteria, the plurality of criteria comprises a plurality of lens criteria and/or a plurality of wearer criteria;

c) generating an optimal set of ophthalmic elements by computing pareto-optimal ophthalmic elements among the ophthalmic elements of the initial set based on the value of each criterion;

d) determining a final ophthalmic element for the wearer in the optimal set of ophthalmic elements based on selected criteria based on wearer's preferences.

Advantageously, such method allows providing an ophthalmic element taken into account the different requirements for a wearer and at the same time ensuring that the determined ophthalmic element is the best compromise complying with the wearer's requirement.

Advantageously, pareto optimal optimization corresponds to the optimization of a plurality of criteria, wherein there is an impossibility of improving one criterion without harming other criteria.

In other words, such method provides a decision aid method to determine by selecting a lens design or a lens among a set of possible compromises using selection criteria at least in part set by the user. Criteria can include advantageously optical criteria, surface criteria as well as wearer criteria.

All the compromises can be pre-calculated further allowing such determination to be done in real-time, i.e. requiring no more additional calculation steps for the selection of the final lens design or lens adapted to the wearer.

Thanks to the invention, after the generation of an optimal set of ophthalmic elements, i.e. a set of possible compromises of ophthalmic elements, the wearer can advantageously choose among this optimal set of ophthalmic elements a final ophthalmic element by improving at least one criterion by modifying the range of this at least one criterion. Thus, the final ophthalmic element form at least one of the best compromise of ophthalmic elements for the wearer.

According to further embodiments which can be considered alone or in combination:

the pareto optimal optimization is an impossibility of improving one criterion without harming other criteria;

the method further comprises selecting at least two criteria among the plurality of criteria based on wearer's preferences, and the optimal set of ophthalmic elements is generated by computing pareto-optimal ophthalmic elements among the ophthalmic elements of the initial set based on the value of each selected criterion;

the ophthalmic element is an ophthalmic lens or an optical design of an ophthalmic lens;

the initial set of ophthalmic elements is provided from a database of predetermined ophthalmic elements;

each predetermined ophthalmic element is an ophthalmic element optimized for the prescription of the wearer;

each ophthalmic element of the initial set is calculated based on a plurality of predetermined ophthalmic elements;

each ophthalmic element of the initial set is a linear combination of the plurality of predetermined ophthalmic elements;

a database of M predetermined ophthalmic lens designs, for example progressive surfaces, denoted Di with 'i' an integer comprised between 1 and M, an initial set of ophthalmic lens designs can be generated by calculating each ophthalmic lens design, each new surface S is defined as follows:

$$S = \sum_{i=1}^{M} \alpha_i D_i,$$

with $$\sum_{i=1}^{M} \alpha_i = 1,$$

each of the new surface S is a progressive surface if the ophthalmic lens designs are chosen to have same inset and same progression length;

the plurality of lens criteria comprises optical criteria and/or surface criteria, the optical criteria being related to an optical parameter of the ophthalmic element and the surface criteria being related to a surface parameter of a surface of the ophthalmic element;

the ophthalmic lens is a progressive ophthalmic lens;

the final ophthalmic element for the wearer is determined in the optimal set of ophthalmic elements based on an order of the selected criteria by the wearer or an eye care practitioner;

the wearer criteria comprises at least information indicative of an activity of the wearer during which the ophthalmic element is intended to be worn by the wearer;

the initial set of ophthalmic elements comprises at least 100 ophthalmic elements, preferably at least 500 ophthalmic elements, and more preferably 1000 ophthalmic elements.

Another object of the invention is directed to a system for the execution of a method for determining an ophthalmic element adapted to a wearer according to the invention as previously described, the wearer having a prescription, the system comprising:

a memory; and a processor arranged to execute a program instructions stored in the memory to:

provide an initial set of ophthalmic elements, each ophthalmic element of the initial set being adapted to the prescription of the wearer;

for each ophthalmic element of the initial set, calculate a value of each criterion of a plurality of criteria, the plurality of criteria comprises a plurality of lens criteria and/or a plurality of wearer criteria;

generate an optimal set of ophthalmic elements by computing pareto-optimal ophthalmic elements among the ophthalmic elements of the initial set based on the value of each criterion;

determine a final ophthalmic element for the wearer in the optimal set of ophthalmic elements based on selected criteria based on wearer's preferences.

According to an embodiment, the pareto optimal optimization is an impossibility of improving one criterion without harming other criteria.

According to an embodiment, the system is configured to be accessible remotely by a distant entity.

The invention further relates to a method for providing an ophthalmic lens to a wearer, the method comprising:

providing wearer data comprising at least the wearer's prescription;

determining an ophthalmic element adapted to the wearer according to the method for determining an ophthalmic element adapted to a wearer according to the invention as previously described; and manufacturing the ophthalmic lens according to the determined ophthalmic element adapted to the wearer.

According to an embodiment, the pareto optimal optimization is an impossibility of improving one criterion without harming other criteria.

According to a further aspect, the invention further relates to a computer program product comprising one or more stored sequence of instruction that is accessible to a processor and which, when executed by the processor, causes the processor to carry out the steps of:

the method for determining an ophthalmic element adapted to a wearer according to invention as previously described; and/or the method for providing an ophthalmic lens to a wearer.

The invention also relates to a computer-readable storage medium having a program recorded thereon; where the program makes the computer execute at least one of the methods of the invention.

The invention further relates to a device comprising a processor adapted to store one or more sequence of instructions and to carry out at least one of the steps of:

the method for determining an ophthalmic element adapted to a wearer according to invention as previously described; and/or the method for providing an ophthalmic lens to a wearer.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

Figure 1:
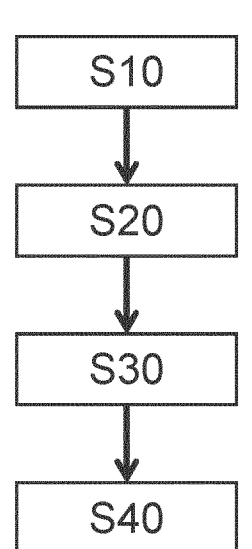
FIG. 1 is an illustration of a chart-flow of a method for determining an ophthalmic element adapted to a wearer according to the invention.
Figure 2:
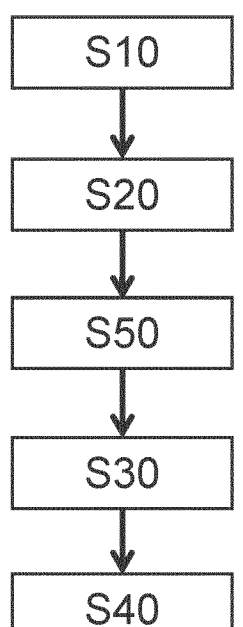
FIG. 2 is an illustration of a chart-flow of a method for determining an ophthalmic element adapted to a wearer according to another embodiment of the invention.

With reference to FIG. 1, the invention relates to a method for determining an ophthalmic element adapted to a wearer. In practice, the method is implemented by computer means.

Preferably, the ophthalmic element is an ophthalmic lens or an optical design of an ophthalmic lens, and more particularly the ophthalmic lens can be a progressive ophthalmic lens.

In the context of the present invention, the term "ophthalmic lens" can refer to an uncut lens or a spectacle lens edged to fit a specific spectacle frame.

The term can also refer to said ophthalmic lens which could present at least one added value such as, for example, tint, polarization filtering, electrochromism, antireflective properties, anti-scratch properties or comprise a photochromic unit or a light guide unit . . . .

In the sense of the invention, an ophthalmic element adapted to a wearer is an ophthalmic element adapted to a wearer's prescription.

The term "prescription" is to be understood to mean a set of optical characteristics of optical power, of astigmatism, of prismatic deviation, and, where relevant, of addition, determined by an ophthalmologist or optometrist in order to correct the vision defects of the wearer, for example by means of a lens positioned in front of his eye. For example, the prescription data can include data for ametropic eyes.

For example, the prescription for a progressive addition lens comprises values of optical power and of astigmatism with an axis for the distance vision and, where appropriate, an addition value. The prescription data may include data for emmetrope eyes.

The adaptation of an ophthalmic lens to the prescription of a wearer is to be checked at least at the point of optical reference of each ophthalmic lens.

The method comprises at least the following steps:
an initial set providing step S10,
a criteria's value calculating step S20,
an optimal set generating step S30, and
a final ophthalmic element determining step S40.

During the initial set providing step S10, an initial set of ophthalmic elements is provided. Each ophthalmic element of the initial set is adapted to the prescription of the wearer.

Preferably, the initial set of ophthalmic elements comprises at least 100 ophthalmic elements, preferably at least 500 ophthalmic elements, and more preferably 1000 ophthalmic elements.

According to an embodiment, the initial set of ophthalmic elements is provided from a database of predetermined ophthalmic elements.

Advantageously, each predetermined ophthalmic element is an ophthalmic element optimized for the prescription of the wearer. In other words, each specific ophthalmic element of the set of ophthalmic elements is designed to fit the prescription of a specific wearer, however two ophthalmic elements of the set may not be designed to fit the same prescription. Thus, the set of ophthalmic elements can comprise several different optical designs designed to fit a prescription for an ametropic eye.

For example, the predetermined ophthalmic elements can be existing ophthalmic lenses. These existing lenses may be calculated lenses according to a specific parameter.

The specific parameter can be an intrinsic ophthalmic element feature (shape, width, . . . ) or a feature relative to the morphology of the wearer.

The specific parameter may be related to the wearer's eye-lens distance or the pantoscopic angle.

The specific parameter may be a maximum value of the width of the ophthalmic element contour for a myopic wearer or a minimal value of the width of an ophthalmic element central portion for a hypermetropic wearer.

These existing lenses may be a plurality of lens prior to optimization and addition to specific features such as the addition of additional layers onto the lens or surface treatment (e.g. surface treatment for blue light filtering). In such manner, the method for determining the suitable optical element according to a wearer is cost effective and enable variable possibility of optimization of the optical element upon the wearer's desire.

Alternatively, each ophthalmic element of the initial set can be calculated based on a plurality of predetermined ophthalmic elements. For example, each ophthalmic element of the initial set can be advantageously a linear combination of the plurality of predetermined ophthalmic elements. The predetermined ophthalmic elements can also be existing ophthalmic lenses.

The linear combination of the plurality of predetermined ophthalmic elements may be a linear combination of progressive surface so as to define a desired progressive surface based on predetermined progressive surfaces without having to redesign a progressive surface from scratch.

For example, considering a database of M predetermined ophthalmic lens designs, for example progressive surfaces, denoted Di with 'i' an integer comprised between 1 and M, an initial set of ophthalmic lens designs can be generated by calculating each ophthalmic lens design, i.e. each new surface S as follows:

$$S = \sum\nolimits_{i=1}^{M} \alpha_i \, D_i,$$

with $$\sum\nolimits_{i=1}^{M} \alpha_i = 1.$$

Each new surface S is a progressive surface if the ophthalmic lens designs are chosen to have same inset and same progression length, for example.

Then, the rear surface can be usually calculated for each surface S to reach a given prescription, taking into account some constraints, for example thickness, prism . . . .

Alternatively, each ophthalmic element of the initial set can be generated by optimization in accordance to at least the visual requirements of the wearer, that is by varying some surfacic parameters while satisfying some constraints.

The constraints can be the center thickness, the edge thickness, the center prism for example and the surfacic parameters of the lens to be varied can be for example the progression length, the inset, the material, the progression length at 85% of the addition, the repartition of the progression, the astigmatism, the kinematic between front diopter and rear diopter. . . . The kinematic is the set of elementary operations (rotations and translations) that enables to change the axis system reference from the front surface axis system to the back surface axis system.

Then, for each ophthalmic element of the initial set, a value of each criterion of a plurality of criteria is calculated during the step S20. The plurality of criteria comprises a plurality of lens criteria and/or a plurality of wearer criteria. Some of the criteria can be chosen by an eye care practitioner and/or the wearer.

The plurality of lens criteria comprises advantageously optical criteria and/or surface criteria. In the sense of the invention, the optical criteria are related to an optical parameter of the ophthalmic element and the surface criteria are related to a surface parameter of a surface of the ophthalmic element.

For example, the optical and surfacic criteria can be the field width, the peak value, position peak and gradient of an optical criterion like astigmatism, optical power, distortion . . . .

In the sense of the invention, distortion is defined as an aberration that results in straight lines being imaged as curved. In ophthalmic optics, "barrel" distortion occurs with minus lenses whereas "pin-cushion" distortion occurs with plus lenses; these are inherent in the optical characteristics of simple plus or minus lenses. Distortion evidenced by waves or ripples in the image of a line viewed through a lens held remotely from the eye can be induced by local surface irregularities resulting from improper processing" (cf. Dictionary of Ophthalmic Optics by A. H. Keeney, R. E. Hagman and C. J. Fratello, Butterworth-Heinemann 1995).

According to another example, the optical and surfacic criteria can be a robustness for example for far vision (FV) power with respect to pantoscopic angle. In this case, the robustness can be defined as a criteria to measure variations of far vision power when wearer conditions (pantoscopic angle and galbe angle) vary.

According to others examples, the optical and surfacic criteria can be related to binocular parameters, the geometry of the lens. . . .

Additionally, the optical criteria could be the central vision optical criterion (CVOC) group which consists of the prismatic deviation in central vision, the ocular deviation, the object visual field in central vision, the image visual field in central vision a magnification in peripheral vision, or a variation of preceding criteria.

In an embodiment, the optical criteria could also be the peripheral vision optical criterion (PVOC) group which consists of the pupil field ray deviation, the object visual field in peripheral vision, the image visual field in peripheral vision, the prismatic deviation in peripheral vision, a magnification in peripheral vision, or a variation of preceding criteria.

The wearer criteria comprise advantageously at least information indicative of an activity of the wearer during which the ophthalmic element is intended to be worn by the wearer: sport, driving, reading, indoor/outdoor . . . .

Advantageously, each wearer criterion can be linked to surfacic and/or optics criteria. For example, the criteria relative to activity like sport, driving, reading can be linked to visual behaviour as field width and astigmatism position peak.

Thus, the criteria relative to the activity of the wearer can be defined by linear combination of optical and surfacic criteria.

The wearer criteria can also be related to the visual behaviour of the wearer (eye mover, head mover, eye lowering when reading, reading distances for different devices . . . ). Such criteria can be deduced from Smart Frames usage or can be given by wearers on web site for examples.

During the optimal set generating step S30, an optimal set of ophthalmic elements is generated by computing pareto-optimal ophthalmic elements among the ophthalmic elements of the initial set based on the value of each criterion.

A pareto optimality is a state of allocation of resources from which it is impossible to reallocate so as to make any one individual or preference criterion better off without making at least one individual or preference criterion worse off. It is a statement of impossibility of improving one criterion without harming other criteria in the subject of multi-objective optimization, also termed Pareto optimization.

In other words, the notion of Pareto optimum makes it possible to divide into two the set of possible ophthalmic elements. We can thus distinguish:

those that are uniformly improvable: it is possible to increase the well-being of certain criteria without reducing that of others.

those that are not uniformly improvable: the increase in the well-being of certain criteria implies the reduction of the well-being of at least one other criterion.

It is the possible ophthalmic elements entering into this second case that are designated as Pareto optima.

So, thanks to the invention all designs for which, for the selected criteria, no other design is better for all criteria are identified and selected.

Then, a final ophthalmic element for the wearer is determined in the optimal set of ophthalmic elements based on selected criteria based on wearer's preferences during the step S40. Doing so, it is possible to modify the relative importance of the criteria and always select the best compromises designs.

Preferably, the final ophthalmic element for the wearer is advantageously determined in the optimal set of ophthalmic elements based on an order of the selected criteria by the wearer or an eye care practitioner.

For example, the wearer can order the criteria relative to his/her activities according to his/her preferences or according to the time spent practicing each activity.

Alternatively, such information can be deduced from a questionnaire on the lifestyle of the wearer or from an application for smartphone or wearable device like a swatch providing data relative to the wearer's lifestyle.

According to another example, the wearer can mark or grade each selected criterion.

According to another example, the wearer can assign a weight to each selected criterion or the wearer can allocate a predetermined number of points between the selected criteria.

According to another embodiment compatible with the previous ones, the method further comprises selecting at least one criterion among the plurality of criteria based on wearer's preferences, and wherein the optimal set of ophthalmic elements is generated by computing pareto-optimal ophthalmic elements among the ophthalmic elements of the initial set based on the value of each selected criterion.

Figure 3:
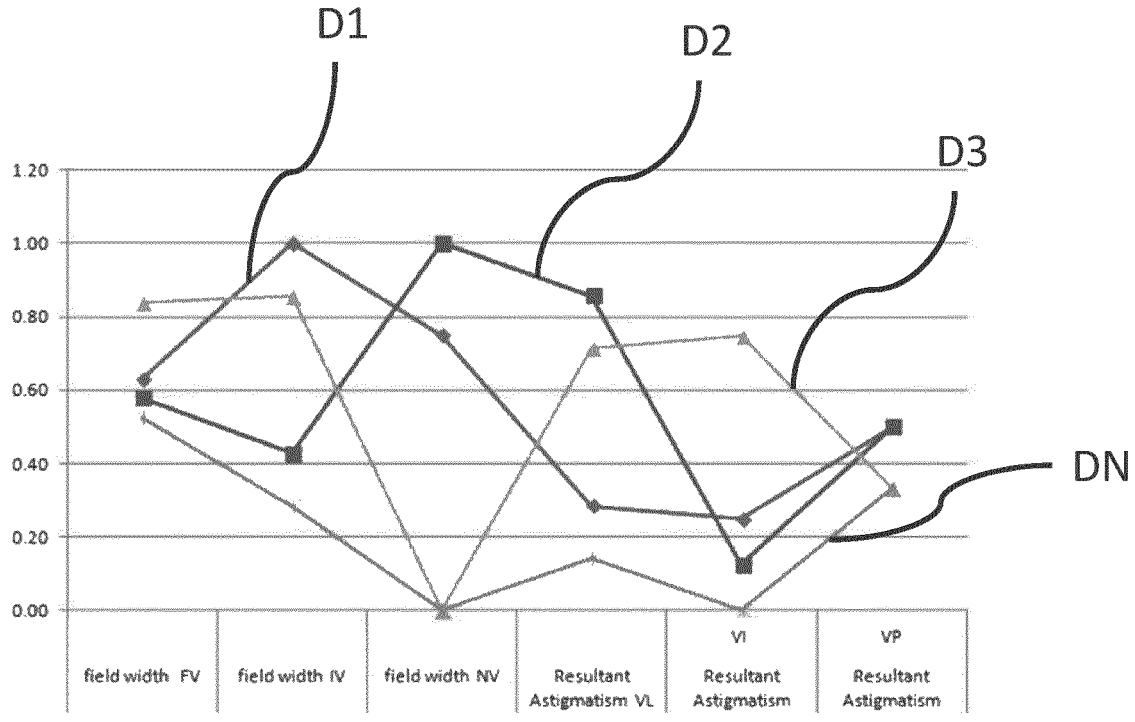
FIGS. 3 and 4 illustrates results of a first and a second implementation of the method according to the invention
Figure 4:
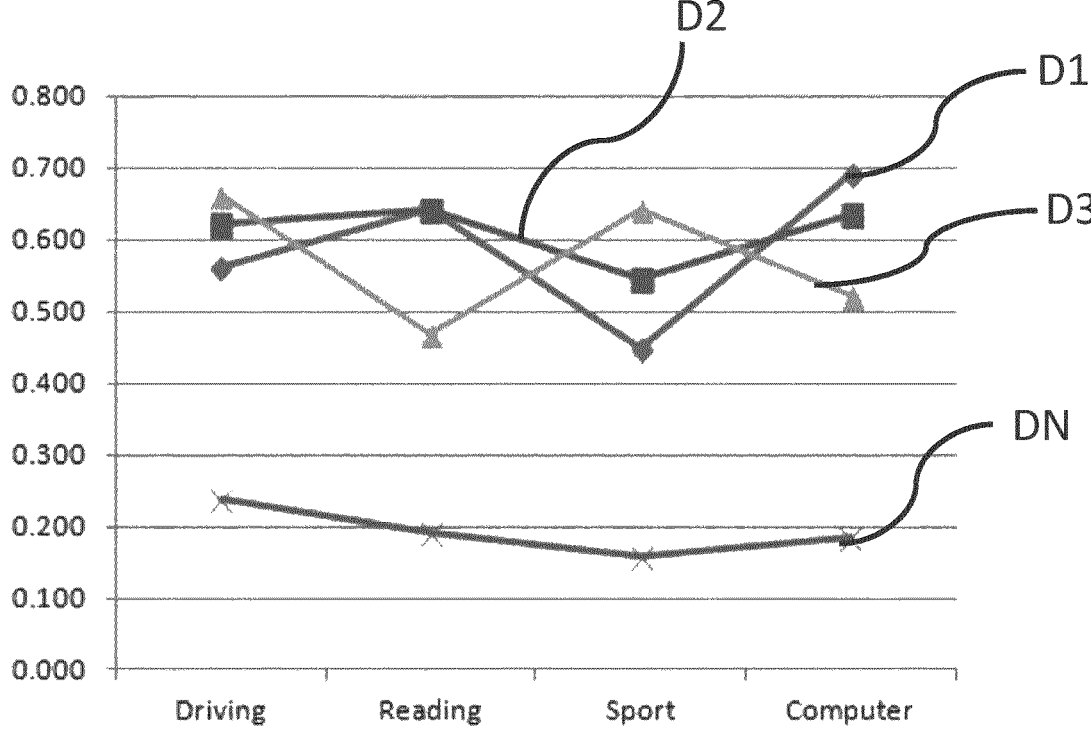

Examples of the implementation of the method according to the invention are now detailed hereafter with reference to FIGS. 3 and 4.

Example 1: Optical and Surfacic Criteria

An example of the implementation of the method according to the invention is now detailed hereafter.

Considering M=5 existing ophthalmic lens designs, each adapted to the prescription of the wearer, N=1000 new ophthalmic lens designs can be generated by linear combination of the 5 existing ophthalmic lens designs. Each new ophthalmic lens designs is also adapted to the prescription of the wearer.

The 1000 new ophthalmic lens designs are provided to form an initial set of ophthalmic elements during the step S10.

Then; six optical criteria are provided: the field width and the resultant astigmatism for far vision (FV), intermediate vision (IV) and near vision (NV).

For each ophthalmic element of the initial set, a value of each criterion is calculated. Table 1 provides the calculated values of the optical criteria for the lenses of the initial set

TABLE 1

Optical criteria values for the ophthalmic elements of the initial set.

| Lenses | field width FV | field width IV | field width NV | Resultant Astigmatism VL | Resultant Astigmatism VI | Resultant Astigmatism VP |
|---|---|---|---|---|---|---|
| D1 | 2.1 | 0.9 | 1.4 | 0.7 | 0.6 | 0.5 |
| D2 | 2.0 | 0.5 | 1.5 | 0.3 | 0.65 | 0.5 |
| D3 | 2.5 | 0.8 | 1.1 | 0.4 | 0.4 | 0.6 |
| . . . | . . . | . . . | . . . | . . . | . . . | . . . |
| DN | 1.9 | 0.4 | 1.1 | 0.8 | 0.7 | 0.6 |
| min | 0.9 | 0.2 | 1.1 | 0.2 | 0.3 | 0.2 |
| max | 2.8 | 0.9 | 1.5 | 0.9 | 0.7 | 0.8 |

The value of the optical criteria can then be normalized. FIG. 3 illustrates the results.

Thus, among the very large set (1000) of ophthalmic lens designs, only the best relevant ophthalmic lens designs according to the 6 selected criteria have to be identified.

To this end, an optimal set of ophthalmic elements is generated by computing pareto-optimal ophthalmic elements among the ophthalmic elements of the initial set based on the value of each criterion, during step 30.

With reference to FIG. 3, only the three ophthalmic lens designs D1, D2 and D3 are in the optimal set of ophthalmic elements. Indeed, D1, D2 and D3 are considered as the best compromises among the initial set of 1000 ophthalmic lens designs.

The ophthalmic lens design DN is not included in the optimal set of ophthalmic elements since it cannot be considered as a good compromise. Indeed, all the values of the criteria are the lowest.

Then, at least one final ophthalmic element for the wearer in the optimal set of ophthalmic elements is determined based on selected criteria based on wearer's preferences.

Preferably, the final ophthalmic element for the wearer is advantageously determined in the optimal set of ophthalmic elements based on an order of the selected criteria by the wearer.

For example, the wearer can select and even more order of the optical and surfacic criteria based on his/her preferences as shown in table 2.

TABLE 2

Selection of the optical and surfacic criteria based on the wearer's preferences.

| User Criteria | User Weight |
|---|---|
| Field with FV | + + + |
| Field with IV | + |
| Field with NV | + |
| Astigmatism VL | + |

TABLE 2-continued

Selection of the optical and surfacic criteria based on the wearer's preferences.

| User Criteria | User Weight |
|---|---|
| Astigmatism VI | + + + |
| Astigmatism VP | + |

For each compromise, that is for each optimal ophthalmic lens design, a score is calculated based on a linear combination of wearer's weights:

D1 5.18;
D2 4.9;
D3 6.68.

For this example, the final ophthalmic element determined for the wearer is thus D3.

Example 2: Wearer Criteria

In this example, as for the example 1, an initial set of 1000 ophthalmic elements is provided during the step S10.

Then, four wearer criteria are provided, each wearer criterion relates to an activity of the wearer during which the ophthalmic element is intended to be worn by the wearer: driving, reading, sport and computer.

For each ophthalmic element of the initial set, a value of each criterion is calculated. Normalized results are given in table 3.

TABLE 3

User criteria values for the ophthalmic elements of the initial set

| Lenses | Driving | Reading | Sport | Computer |
|---|---|---|---|---|
| D1 | 0.563 | 0.642 | 0.45 | 0.692 |
| D2 | 0.623 | 0.643 | 0.548 | 0.636 |
| D3 | 0.662 | 0.469 | 0.643 | 0.521 |
| . . . | . . . | . . . | . . . | . . . |
| DN | 0.239 | 0.191 | 0.157 | 0.187 |

During step 30, an optimal set of ophthalmic elements is generated by computing pareto-optimal ophthalmic elements among the ophthalmic elements of the initial set based on the value of each criterion.

In the same manner as for example 1, the optimal set of ophthalmic elements generated by computing pareto-optimal ophthalmic elements based on the value of each criterion comprises the ophthalmic elements of the initial set D1, D2 and D3, during step 30. Thus, D1, D2 and D3 are considered as the best compromises among the initial set of 1000 ophthalmic lens designs.

On the contrary, the ophthalmic lens design DN is not included in the optimal set of ophthalmic elements since all the values of the criteria are the lowest.

Then, at least one final ophthalmic element for the wearer in the optimal set of ophthalmic elements is determined based on selected criteria based on wearer's preferences.

Preferably, the final ophthalmic element for the wearer is advantageously determined in the optimal set of ophthalmic elements based on an order of the selected criteria by the wearer.

For example, the wearer attributes 10 points to the different wearer criteria in order to determine among the pareto-optimal ophthalmic elements previously calculated, the final ophthalmic element which fits wearer's wish as shown in table 4.

TABLE 4

Selection of the wearer criteria based on the wearer's preferences.

| User Criteria | User Weight |
|---|---|
| Driving | + + + + + |
| Reading | + |
| Sport | + + + |
| Computer | + |

For each pareto-optimal ophthalmic lens design, a score is calculated based on a linear combination of wearer's weight:

D1 5.49;

D2 6.02;

D3 6.23.

For this example, the final ophthalmic element determined for the wearer is thus D3.

Figure 5:
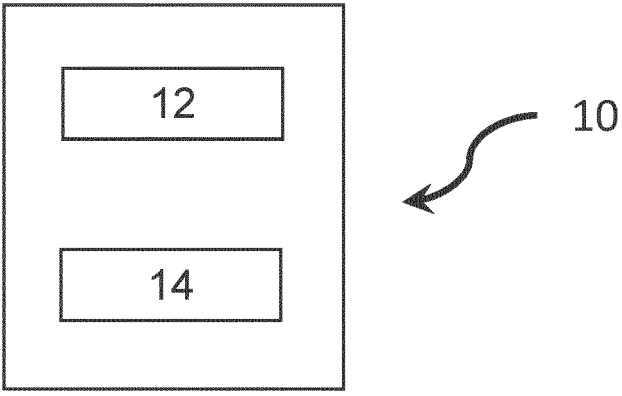
FIG. 5 is an illustration of a system for the execution of the method for determining an ophthalmic element adapted to a wearer according to the invention.

With reference to FIG. 5, the invention is also directed to a system 10 for the execution of such a method for determining an ophthalmic element adapted to a wearer according to the invention as previously described, the wearer having a prescription, the system comprising:

a memory 12; and a processor 14 arranged to execute a program instructions stored in the memory to:

provide an initial set of ophthalmic elements, each ophthalmic element of the initial set being adapted to the prescription of the wearer;

for each ophthalmic element of the initial set, calculate a value of each criterion of a plurality of criteria, the plurality of criteria comprises a plurality of lens criteria and/or a plurality of wearer criteria;

generate an optimal set of ophthalmic elements by computing pareto-optimal ophthalmic elements among the ophthalmic elements of the initial set based on the value of each criterion;

determine a final ophthalmic element for the wearer in the optimal set of ophthalmic elements based on selected criteria based on wearer's preferences.

Such system can be configured to be accessible remotely. For example the method can be implemented from a request generated and transmitted from a website.

Figure 6:
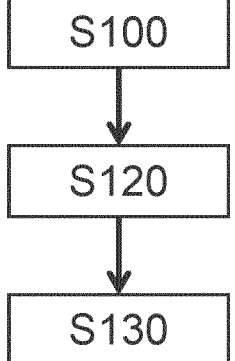
FIG. 6 is an illustration of a chart-flow of a method for providing an ophthalmic lens to a wearer according to the invention.

Another object of the invention relates to a method for providing an ophthalmic lens to a wearer. With reference to FIG. 6, the method comprises:

a wearer data providing step S100, an ophthalmic element determining step S120, and an ophthalmic lens manufacturing step S130.

During the wearer data providing step S100, wearer data comprising at least the wearer's prescription are provided.

Then, an ophthalmic element adapted to the wearer is determined according to the method for determining an ophthalmic element adapted to a wearer according to the invention as previously described, during the ophthalmic element determining step S120.

The ophthalmic lens according to the determined ophthalmic element adapted to the wearer is then manufactured during step S130.

The invention as disclosed hereinbefore allows providing an ophthalmic element taken into account the different requirements for a wearer and at the same time ensuring that the determined ophthalmic element is the best compromise complying with the wearer's requirement. Such method provides a decision aid method to determine by selecting a lens design or a lens among a set of possible compromises using selection criteria at least in part set by the user. Criteria can include advantageously optical criteria, surface criteria as well as wearer criteria.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by a processor for determining an ophthalmic element adapted to a wearer, the wearer having a prescription, the method comprising at least:

a) obtaining an initial set of at least 100 ophthalmic elements, each ophthalmic element of the initial set being adapted to the prescription of the wearer;

b) for each ophthalmic element of the initial set of at least 100 ophthalmic elements, calculating a value of each criterion of a plurality of criteria based on a weighted function, the plurality of criteria comprises a plurality of lens criteria and/or a plurality of wearer criteria;

c) generating an optimal set of ophthalmic elements by computing pareto-optimal ophthalmic elements among the ophthalmic elements of the initial set of at least 100 ophthalmic elements based on the value of each criterion; and d) determining a final ophthalmic element for the wearer in the optimal set of ophthalmic elements based on selected criteria based on wearer's preferences.

2. The method according to claim 1, further comprising selecting at least two criteria among the plurality of criteria based on wearer's preferences, wherein the optimal set of ophthalmic elements is generated by computing pareto-optimal ophthalmic elements among the ophthalmic elements of the initial set of at least 100 ophthalmic elements based on the value of each selected criterion.

3. The method according to claim 1, wherein the ophthalmic element is an ophthalmic lens or an optical design of an ophthalmic lens.

4. The method according to claim 1, wherein the initial set of at least 100 ophthalmic elements is obtained from a database of predetermined ophthalmic elements.

5. The method according to claim 4, wherein each predetermined ophthalmic element is an ophthalmic element optimized for the prescription of the wearer.

6. The method according to claim 4, wherein each ophthalmic element of the initial set of at least 100 ophthalmic elements is calculated based on a plurality of predetermined ophthalmic elements.

7. The method according to claim 6, wherein each ophthalmic element of the initial set of at least 100 ophthalmic elements is a linear combination of the plurality of predetermined ophthalmic elements.

8. The method according to claim 7, wherein a database of M predetermined ophthalmic lens designs denoted Di with 'i' an integer comprised between 1 and M, an initial set of ophthalmic lens designs is generatable by calculating each ophthalmic lens design, each new surface S is defined as follows:

$$S = \sum_{i=1}^{M} \alpha_i \ D_i,$$

with $$\sum_{i=1}^{M} \alpha_i = 1,$$

each of the new surface S is a progressive surface if the ophthalmic lens designs are chosen to have same inset and same progression length.

9. The method according to claim 1, wherein the plurality of lens criteria comprises optical criteria and/or surface criteria, the optical criteria being related to an optical parameter of the ophthalmic element and the surface criteria being related to a surface parameter of a surface of the ophthalmic element.

10. The method according to claim 1, wherein the final ophthalmic element for the wearer is determined in the optimal set of ophthalmic elements based on an order of the selected criteria by the wearer or an eye care practitioner.

11. The method according to claim 1, wherein the wearer criteria comprises at least information indicative of an activity of the wearer during which the ophthalmic element is intended to be worn by the wearer.

12. A system for determining an ophthalmic element adapted to a wearer, the wearer having a prescription, the system comprising:

a memory; and a processor arranged to execute program instructions stored in the memory to:

obtain an initial set of at least 100 ophthalmic elements, each ophthalmic element of the initial set of at least 100 ophthalmic elements being adapted to the prescription of the wearer;

for each ophthalmic element of the initial set of at least 100 ophthalmic elements, calculate a value of each criterion of a plurality of criteria based on a weighted function, the plurality of criteria comprises a plurality of lens criteria and/or a plurality of wearer criteria;

generate an optimal set of ophthalmic elements by computing pareto-optimal ophthalmic elements among the ophthalmic elements of the initial set of at least 100 ophthalmic elements based on the value of each criterion; and

determine a final ophthalmic element for the wearer in the optimal set of ophthalmic elements based on selected criteria based on wearer's preferences.

13. A method for providing an ophthalmic lens to a wearer, the method comprising:

obtaining wearer data comprising at least the wearer's prescription;

determining an ophthalmic element adapted to the wearer according to claim 1; and manufacturing the ophthalmic lens according to the determined ophthalmic element adapted to the wearer.

14. A computer readable medium comprising one or more stored sequences of instructions that are accessible to a processor and which, when executed by the processor, causes the processor to carry out at least:

a) obtaining an initial set of at least 100 ophthalmic elements, each ophthalmic element of the initial set of at least 100 ophthalmic elements being adapted to the prescription of the wearer;

b) for each ophthalmic element of the initial set of at least 100 ophthalmic elements, calculating a value of each criterion of a plurality of criteria based on a weighted function, the plurality of criteria comprises a plurality of lens criteria and/or a plurality of wearer criteria;

c) generating an optimal set of ophthalmic elements by computing pareto-optimal ophthalmic elements among the ophthalmic elements of the initial set of at least 100 ophthalmic elements based on the value of each criterion, where the pareto optimal optimization is an impossibility of improving one criterion without harming other criteria; and d) determining a final ophthalmic element for the wearer in the optimal set of ophthalmic elements based on selected criteria based on wearer's preferences.

15. The method according to claim 1, wherein the initial set of at least 100 ophthalmic elements comprises at least 500 ophthalmic elements.

16. The method according to claim 1, wherein the initial set of at least 100 ophthalmic elements comprises at least 1000 ophthalmic elements.

17. The method according to claim 1, wherein the lens criteria comprises field width, peak value, position peak, gradient of an optical criterion, which includes astigmatism or optical power or distortion, robustness for far vision (FV) power with respect to pantoscopic angle, binocular parameters, geometry of the lens, prismatic deviation in central vision or peripheral vision, ocular deviation, object visual field in central vision or peripheral vision, image visual field in central vision or peripheral vision, magnification in central vision or peripheral vision, or pupil field ray deviation, and the wearer criteria comprises at least one of an activity of the wearer or visual behavior of the wearer.

* * * * *